United States Patent [19]

Nuchman et al.

[11] Patent Number: 4,580,882

[45] Date of Patent: Apr. 8, 1986

[54] CONTINUOUSLY VARIABLE CONTACT LENS

[76] Inventors: Benjamin Nuchman, 820 Birchwood Dr., Westbury, N.Y. 11590; Sang Y. Whang, 8445 SW. 148th Dr., Miami, Fla. 33158

[21] Appl. No.: 487,330

[22] Filed: Apr. 21, 1983

[51] Int. Cl.⁴ .......................... B24B 1/00; G02C 7/04
[52] U.S. Cl. ................................ 351/161; 51/284 R; 51/324; 351/160 H; 351/176; 351/177
[58] Field of Search ............................. 51/284 R, 324; 351/160 R, 160 H, 161, 162, 176, 177

[56] References Cited

U.S. PATENT DOCUMENTS

| | | | |
|---|---|---|---|
| Re. 25,286 | 11/1962 | de Carle | 351/161 |
| 3,031,927 | 5/1962 | Wesley | 351/161 |
| 3,210,894 | 10/1965 | Bentley et al. | 51/284 |
| 3,693,301 | 9/1972 | Lemaitre | 51/324 X |
| 3,932,148 | 1/1976 | Krewalk, Sr. | 51/284 R |
| 4,195,919 | 4/1980 | Shelton | 351/160 R |
| 4,199,231 | 4/1983 | Evans | 351/160 H |

FOREIGN PATENT DOCUMENTS

| | | | |
|---|---|---|---|
| 605053 | 11/1934 | Fed. Rep. of Germany | 351/177 |
| 83256 | 7/1971 | German Democratic Rep. | 351/177 |
| 939016 | 10/1963 | United Kingdom | 351/161 |
| 963407 | 7/1964 | United Kingdom | 351/177 |

OTHER PUBLICATIONS

W. N. Charman, "Optical Characteristics of Bausch & Lomb Soflens (PAI) Bifocals", 11 Int. Contact Lens Clinic, 564, (No. 9, Sep. 1984).
A. N. Meier & G. E. Lowther, "Measured Power Distribution Across the Bausch and Lomb Soflens (PAI) Bifocal", J. Am. Optom. Ass., 263, (No. 3, Mar. 1983).
St. Palley, S. L.; "The Polyvision Multifocal Lens-Theory and Design"; *Optical Journal Review;* Apr. 1, 1959; pp. 40–42.

*Primary Examiner*—John K. Corbin
*Assistant Examiner*—Scott J. Sugarman
*Attorney, Agent, or Firm*—Blum Kaplan Friedman Silberman & Beran

[57] ABSTRACT

A continuously variable multi-focal soft contact lens wherein a continuous optical gradient in a region smaller than the maximum pupil opening is provided. The concave surface is aspheric with a desired optical power for distant viewing at the center which increases to the desired near vision power. The increase is usually about 3 to 5 diopters within 6 mm of the anterior optical zone (AOZ) which is approximately 9.7 mm in diameter when wet. Outside this 6 mm zone the concave surface is essentially spherical. The concave surface is an aspheric curve having a steeper curve in the middle than a base curve $r_2$. The curve at the center is the steepest and is designated as $r_2'$. Once $r_2$ and $r_2'$ curves are determined, the thickness of the lens (t) and the radius of curavation for AOZ designated $r_1$ is calculated using the desired optical power at the apex of the lens ($P_w$) and desired thickness at the junction (JTK) of the AOZ, based on the following equation:

$$P_w = \frac{1}{\dfrac{r_1 \times \text{Exp}}{n-1} - \dfrac{t \times \text{Exp}}{n}} - \frac{n-1}{r_2' \times \text{Exp}}$$

wherein Exp is the expansion factor and n is the index of refraction of the lens when wet, all other dimension in the dry state, before expansion. The lenses may be manufactured by lathe cut and polish means using the squeeze method or may be duplicated by molding and casting.

35 Claims, 8 Drawing Figures

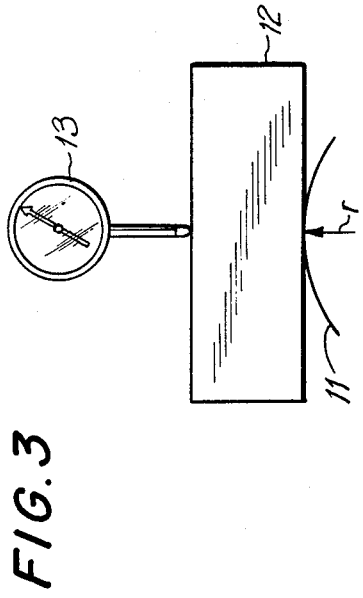
FIG.3a
FIG.3
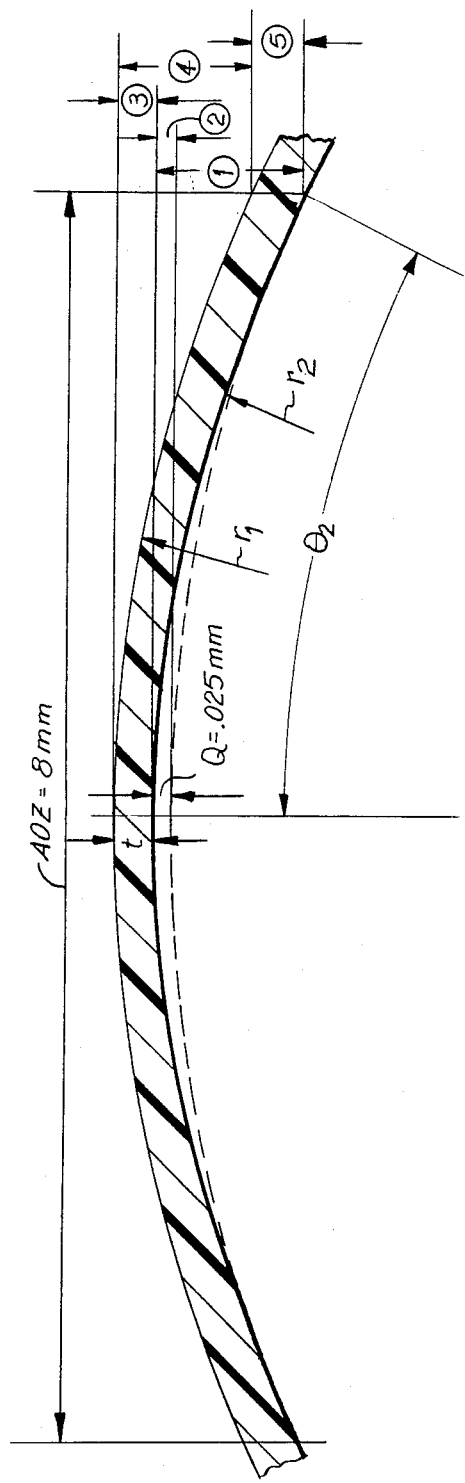
FIG.4

CONTINUOUSLY VARIABLE CONTACT LENS

BACKGROUND OF THE INVENTION

This invention relates to contact lenses, and more particularly to continuously variable multi-focal soft contact lenses suitable for creating sharp images of far objects, intermediate objects and near objects simultaneously on the retina of a wearer, including lenses which may be used to correct for astigmatism.

There is great demand and interest in providing a contact lens that can be successfully used for both distance vision as well as for close-up reading. Currently, there are three approaches attempting to solve this problem. These approaches include the alternating vision bi-focal contact lens and the simultaneous vision bi-focal contact lens which encompasses both the right-eye/left-eye method and the blended bi-focal lens.

The alternating vision bi-focal contact lens generally has two optical zones. The first optical zone for viewing distant objects generally is in the middle of the lens. The optical zone for viewing near objects generally surrounds the first optical zone. Each optical zone is larger than the normal pupil opening so that a wearer must adapt to position the lens properly for proper application. This is a difficult task to train the patient to move the two optical zones when desired. This is particularly true with large comfortable soft contact lenses which do not move freely to switch the position of the optical zones at will. Thus, such lenses are not fully satisfactory and often the transition between the two optical zones is positioned in front of the pupil resulting in blurred vision.

Simultaneous vision bi-focal contact lenses take advantage of the ability of the human brain which has the capability of selectively choosing a sharp image when there are both sharp and blurry images projected on the retinas simultaneously. This ability to choose the sharp image leads to the two approaches using this method. In the right-eye/left-eye method one eye is fitted with a distant vision lens and the other eye is fitted with a near vision lens. The brain then selects the vision in one eye at a time. Obviously, since only one eye is used at a time the wearer looses the sense of depth perception.

The second approach utilizing the simultaneous vision bifocal contact lens is the blended bi-focal lens with one optical zone smaller than the pupil opening. This is similar to the alternating vision lens described above which has two optical zones. The distant vision zone in the center of the lens is made smaller than the normal pupil opening to insure that both optical zones are simultaneously presented to the pupil. The transition from one optical zone to the other is blended in an effort to reduce the abrupt discontinuity and glare caused by a sharp transition between zones. Notwithstanding that the transition is blended, it does not provide continuity between the two vision zones. Significantly, for any object in between the near and the far zones, two images equally out of focus will be formed on the retina that will cause confusion to the wearer.

Based on the above, it can be seen that all three approaches attempting to provide multi-focal contact lenses currently under study have severe problems which are inherent in any bi-focal lens. Because the lenses have two optical zones, one for reading and for distant vision, most anything in between, such as the dashboard of an automobile, is either blurred or forms double images, equally out of focus. Another draw back of each of the approaches under study when applied to the more comfortable soft lenses is that it is very difficult to correct for astigmatism. Accordingly, it is desirable to provide improved continuously variable multi-focal contact lenses which overcome the drawbacks present in the prior art lenses.

SUMMARY OF THE INVENTION

Generally speaking, in accordance with the invention, an improved contact lens with continuously varying multi-focal optical power having sufficient power within a diameter smaller than the normal pupil opening in the middle of the contact lens is provided. The desired distance vision power is at the center region of the lens and the power increases to the desired near vision power as the diameter approaches the normal pupil opening, or about 5 to 7 mm in the state to be worn for creating sharp images of far objects, intermediate objects and near objects simultaneously on the retina of a wearer. In a non-toric lens, the lens has complete rotational symmetry.

In a typical lens for a near-sighted eye the greatest power of $-3$ to 5 diopters at the center continuously increases to zero at the 5 to 7 mm diameter and remains at 0 diopter to the edge of the optical zone at approximately 9.7 mm in diameter. The concave surface of the lenses is aspheric and the other surfaces can be spheric, aspheric or toric.

Soft lenses are generally prepared in the hard state before expansion so that all calculations are performed using the dimensions in the dry (or hard) state, except for calculation of optical power. Optical powers for an expandable lens are calculated in the wet (or soft) state using the dry state dimensions multiplied by the appropriate expansion factor:

$$P_w = \frac{1}{\frac{r_1 \times \text{Exp}}{n-1} - \frac{t \times \text{Exp}}{n}} - \frac{n-1}{r_2' \times \text{Exp}}$$

wherein:

Exp is the expansion factor;
n is the index of refraction of the material when wet;
t is the thickness of the lens;
$r_2'$ is the radius of curvature of the concave surface at the center; and
$r_1$ is the radius of curvature of the convex surface.

The lenses in accordance with the invention are prepared by squeezing a lens blank by a ball and cutting the lens blank while held squeezed and then releasing the button after cutting and polishing. The cut and polished surface before releasing is spherical and after release it becomes aspherical. The amount of deformation created by the squeeze is measured by a micrometer which indicates the amount of displacement. A detailed procedure is set forth in our U.S. Pat. No. 4,074,469.

The concave aspherical surface generated by this method is essentially spherical from approximately a 5 mm diameter (before expansion) and out and it has a base curve radius of $r_2$. The aspherical curve in the middle has a steeper radius than the base curve $r_2$. The radius of curvature of this curve is the steepest at the center and is a designated as $r_2'$. The difference between $r_2'$ and $r_2$, as well as the displacement distance between the actual curve and the spherical curve and the gradient diameter size are controlled by the amount of squeeze, the size of the ball diameter, and the depth of cut (or remaining thickness of the cut blank). Once $r_2$ and $r_2'$ are determined, the thickness of the lens t and the convex radius of curvature $r_1$ are calculated using the desired optical power at the apex of the lens and the desired thickness at the junction of the optical zone. The remaining parameters of the lens are designed by conventional means.

Since the lens has rotational symmetry, the equipower contour will be a circle. For an eye with astigmatism, an elliptical contour will create a sharp image of an article on the retina as long as the necessary vertical optical power and horizontal optical power are available on the lens within the normal pupil opening, namely within about a 5 mm diameter region before expansion of the lens.

Accordingly, it is an object of the invention to provide an improved contact lens.

Another object of the invention is to provide an improved continuously variable multi-focal contact lens.

It is a further object of the invention to provide a continuously variable multi-focal contact lens wherein the concave surface is aspheric.

It is another object of the invention to provide a multi-focal contact lens having a continuously variable optical zone at the middle of the lens with a sufficient power variation within a diameter less than the normal pupil opening.

Still another object of the invention is to provide a method for forming a continuously variable multi-focal contact lens.

Still a further object of the invention is to provide an improved continuously variable multi-focal contact lens which will correct for astigmatism.

Still other objects and advantages of the invention will in part be obvious and will in part be apparent from the specification.

The invention accordingly comprises the several steps and the relation of one or more of such steps with respect to each of the others, and the article possessing the features, properties and relation of elements, which are exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which:

FIGS. 3 and 3a are cross-sectional views of steps in the process of preparing the lens of FIGS. 1 and 2;

FIG. 4 is a cross-sectional view of a portion of the lens of FIGS. 1 and 2 illustrating dimensional relationships for design of the lens;

DESCRIPTION OF THE PREFERRED EMBODIMENTS

Figure 1:
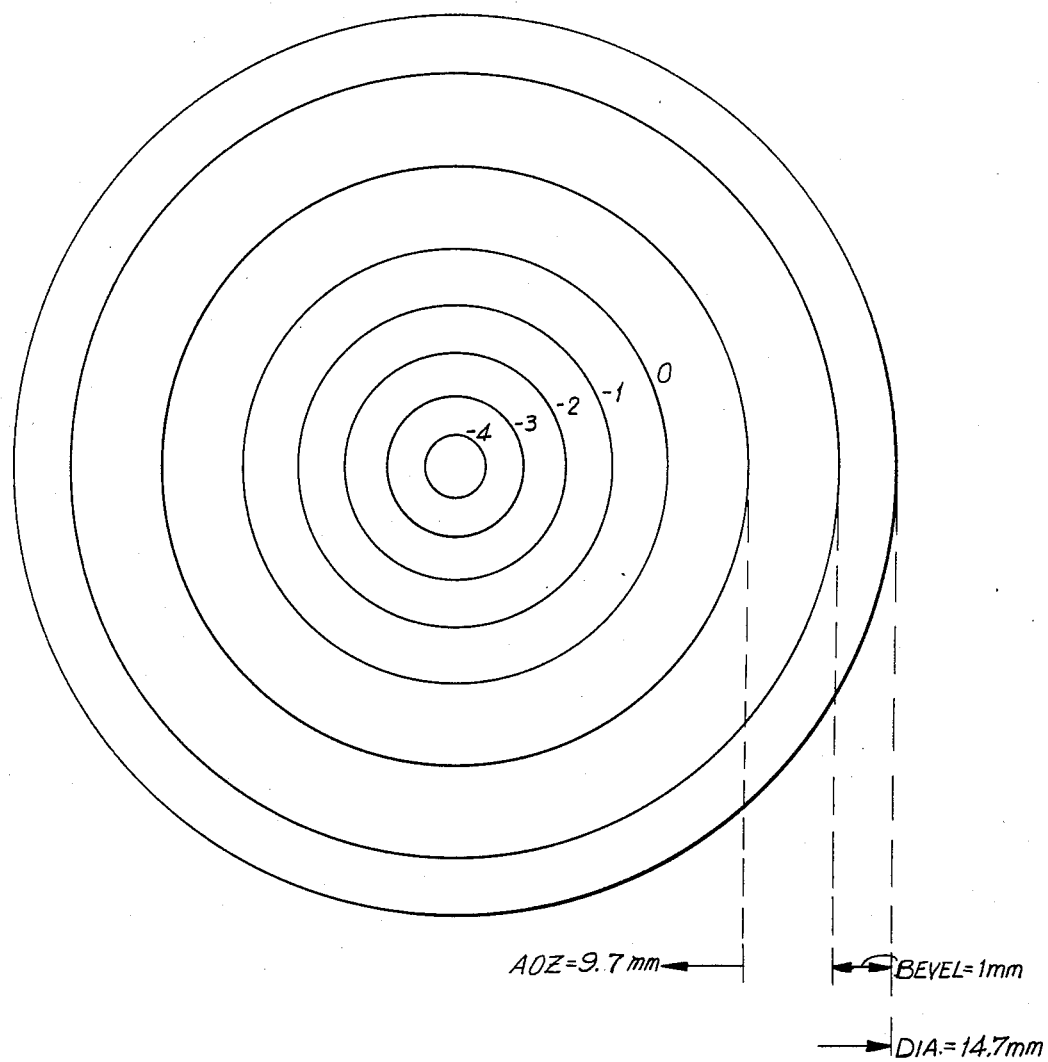
FIG. 1 is a plan view illustrating the optical power variation of a soft contact lens constructed and arranged in accordance with the invention.

FIG. 1 is a plan view illustrating a continuously varying multi-focal soft contact lens in the expanded wet state or in condition for wearing as prepared in accordance with the invention. The lens has complete rotational symmetry with the greatest power of approximately $-4$ diopters at the center which increases to 0 diopter within a zone having a diameter of approximately 6 mm. The lens is lenticular having an anterior optical zone of approximately 9.7 mm in diameter. The overall diameter of the expanded lens is approximately 14.7 mm.

The lens of FIG. 1 may be formed of any commercially available soft contact lens material. For example, the specific lenses fabricated in accordance with the invention and described herein are formed of HEMA material, such as hydroethylmethacrylate. The invention is applicable equally to all soft contact lens materials of HEMA analogs, ethylene glycol dimethacrylate (EGMA) or its analogs, polymethylacrylate (PMMA) or its analog, polyvinyl pyrrolidone (PVP) and the like. Generally, these soft lens materials swell and absorb varying amounts of water depending on the specific polymer material. HEMA lens blanks are generally available which swell to a water content of 55%, 45% or 38%.

Figure 2:
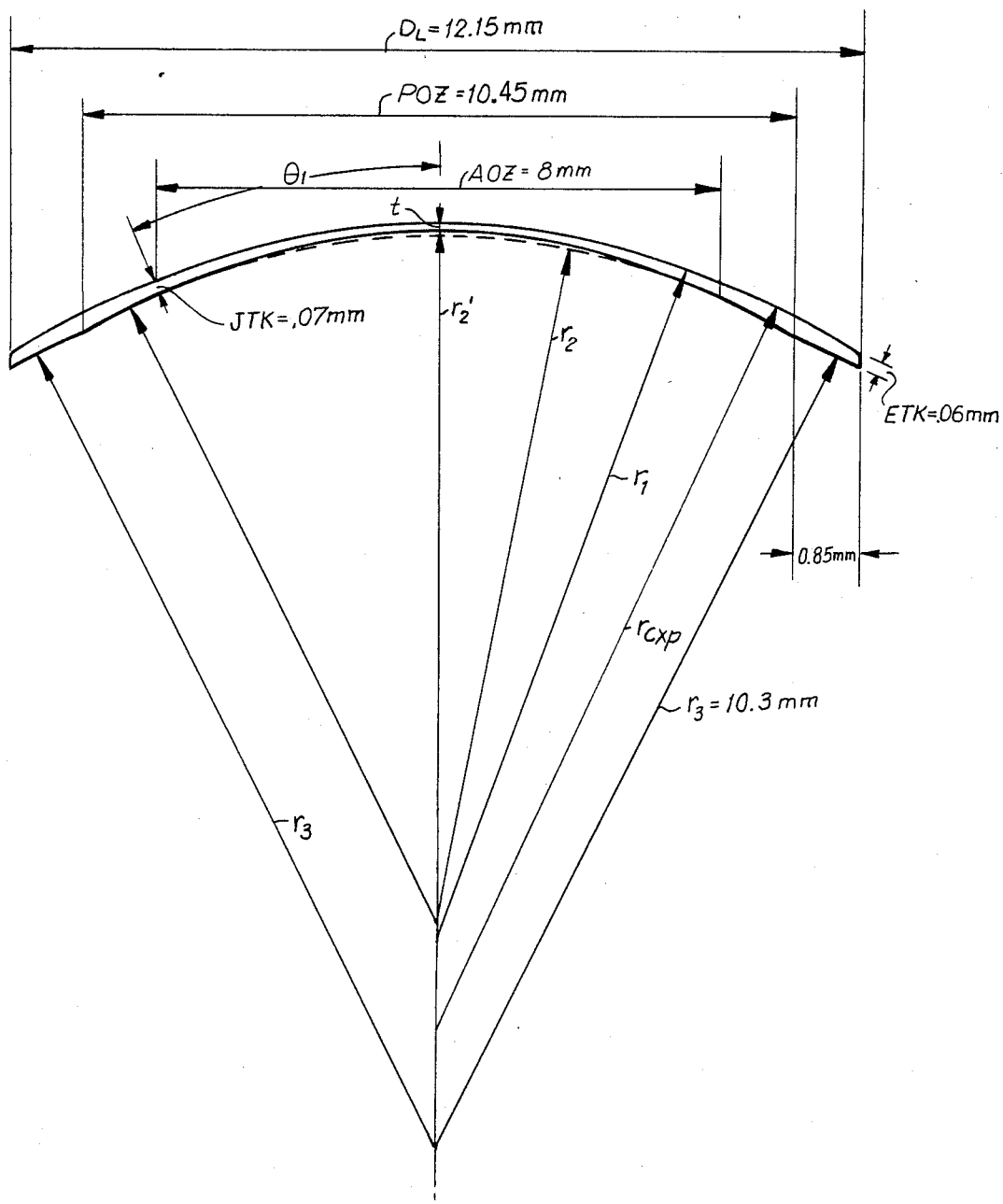
FIG. 2 is cross-sectional view of the soft contact lens of FIG. 1 before expansion.

Referring now to FIG. 2, a cross-sectional view of the lens illustrated in FIG. 1 in its dry state before expansion is shown. All dimensions in FIG. 2 are reduced by 17% from that in FIG. 1. This is due to the fact that the design and manufacture of soft lenses in accordance with the invention are performed in the hard state before expansion. Thus, the following descriptions are performed using the dimensions in the dry state, except for the calculation of optical power. The optical power is calculated for the wet state using the dry state dimensions multiplied by the appropriate expansion factor. For the HEMA material utilized in the exemplary embodiments, the expansion factor is 1.21 and the expanded lens contains about 45 percent water. The expansion factor for a lens material including 35 percent water is 1.18 and for 55 percent water is 1.31.

In the lens illustrated in FIG. 2, all the curves are spherical except the inside concave curve which is aspherical. This base curve is essentially spherical from approximately a 5 mm diameter and out and which base curve has a radius of $r_2$. If the inside concave curve was spherical with the same $r_2$ radius, the inside concave curve would follow the dotted line curve in the middle of the lens. As shown in FIG. 2, the curve is steeper in the middle than base curve $r_2$. The radius of curvature of this aspheric curve is steepest at the center and is designated as $r_2'$. Control of the difference between $r_2'$ and $r_2$, as well as the displacement distance between the actual curve (the solid line curve) and the spherical curve (the dotted line curve) and how to fabricate the gradient within the desired diameter represent important aspects of the invention. The concave surface of the lens is aspheric and the other surfaces can be aspheric, spheric or toric. Outside the center optical region, the concave surface of the lens is essentially spherical.

Once the dimensions of $r_2$ and $r_2'$ curve are determined, the thickness of the lens (t) and the convex curve having a radius of curvature $r_1$ are calculated using the desired optical power at the apex of the lens and the desired thickness at the junction of the anterior optical zone (AOZ) which has nominally been set at 8 mm. The remainder of the curves are determined by conventional means. The bevel width and bevel radius are selected arbitrarily, based on experience. In the exemplary embodiments the bevel width is set at 0.85 mm and the bevel radius is set at 10.3 mm. Since curve $r_2$ is essentially spherical at the 8 mm junction point, one can calculate the curvature of the peripheral convex curve having a radius, $r_{cxp}$, based on the designed junction thickness and desired edge thickness of the lens. In order to obtain the desired properties of the lens, namely a simultaneous multi-focal contact lens, the optical power gradient from the desired distance vision power at the center must increase about 3 to 5 diopters within a region having a diameter less than a normal pupil opening. A normal pupil opening is the maximum opening in the dark and is generally about 6 mm in diameter. Accordingly, the sufficient optical power gradient is formed in a region of the lens between about 4.5 mm and 5.5 mm in diameter in the dry state.

The simultaneous multi-focal contact lens provides gradually varying focal power within a central region of a dimension less than the normal opening of the pupil of a wearer. Due to this, at least some part of the lens in the central region forms a sharp image of a distant object on the retina while another part of the lens forms a sharp image of a near by object on the retina. Even though the center region of the lens forms a blurred image of a near by object, so long as there is a sharp image of the near object on the retina simultaneously, the human brain selectively picks up the sharper image of the desired object. It is this selective power of the human brain to select the sharp image which enables the lenses prepared in accordance with the invention to provide a continuously variable multi-focal effect.

The soft contact lenses with the concave surface including an aspheric curve which provides the optical power gradient within the pupil opening may be prepared by the apparatus and method described in our prior U.S. Pat. No. 4,074,469 which issued on Feb. 21, 1978. The apparatus disclosed therein provides for forming aspheric surfaces in an optical lens by distorting the lens blank in a predetermined manner and forming spherical surface in the distorted lens blank. The distorted lens button is released and the formed concave surface becomes aspheric. Accordingly, the entire specification of our earlier patent is incorporated by reference as if fully set forth herein.

In accordance with our method, an uncut lens blank is squeezed by a ball having a radius R. The blank is then cut and polished while held in the squeezed position and then released. The amount of displacement created by the squeeze is measured by a micrometer so that one can tell exactly how much displacement is imparted. This amount of displacement is exactly the same as the displacement distance between the aspherical solid line and the spheric dotted line curve in FIG. 2.

The greater the deformation imparted to the lens blank prior to cutting results in a greater optical power gradient in the final lens. At times, a dry blank of soft lens material may be too brittle to squeeze the desired amount before cracking. In this case, it is advisable to precut the blank to prevent cracking. There is no need to polish this cut and the amount of displacement caused by the squeeze is also measured by a micrometer.

FIG. 3 illustrates the relative position of a ball 11 having a radius R and an uncut lens blank 12 to be deflected when ball 11 is displaced in the direction of the arrow. A micrometer 13 positioned above uncut lens blank 12 is utilized to determine the distortion applied to lens blank 12. FIG. 3a illustrates the position of ball 11, a cut but not polished lens button 14 and micrometer 13. The details of construction of an apparatus suitable for holding lens blanks 12 and 14 button and micrometer 13 is described in detail in our prior patent. Accordingly, the details of construction need not be set forth herein.

It has been found for a given amount of center displacement (squeeze), the final thickness of the cut button and the size of the radius of the squeezing ball R changes the size of the lens region within which the optical power gradient occurs. A steeper radius R of ball 11 yields narrower regions for the aspheric zones and a flatter radius R of ball 11 yields wider regions for the aspheric zones. The thinner the final thickness of the lens button, the narrower the region of the aspheric zone and the thicker the final thickness of the lens button, the wider the region of the aspheric zone. Similarly, for the same amount of squeeze, a smaller aspheric region results in a greater power gradient or a steeper aspheric curve $r_2'$ for the same base curve $r_2$. The opposite is also true.

The following exemplary embodiment is a typical combination of squeeze and cuts which results in a lens having the following preferred results:

TYPICAL COMBINATION p1 Radius of ball used to squeeze: R=6 mm

Amount of squeeze: Q=25 micron
Final thickness of cut and polished button Tb: =1.8 mm

TYPICAL RESULTS

Region of aspheric zone: GOZ≃5.0 mm
Difference between $r_2$ and $r_2'$ ($r_2-r_2'$): $\Delta r_2 \approx 0.6$ mm
Optical power gradient (after wet): $\Delta P_w \approx 4$ diopter The above results are typical average figures in accordance with the invention and are presented by way of illustration only. They are not presented in a limiting sense. These results are governed by the following relationships:

$GOZ \approx f(Q+Tb+R)$
$\Delta r_2 \approx g(Q-Tb-R)$
$\Delta P_w \approx h(Q-Tb-R)$ That is, an increase in Q increases GOZ, $\Delta r_2$ and $\Delta P_w$ while an increase of Tb and R increases GOZ, but decreases $\Delta r_2$ and $\Delta P_w$.

Once a blank is squeezed, cut and polished for the concave surfaces, (the center base curve and the bevel curve), the button is released and measurements are made. The following information is kept with the button.

1. The amount of squeeze: Q
2. The periphery base curve: $r_2$
3. The central curve: $r_2'$
4. The thickness of the cut button: Tb
5. The bevel radius: $r_3$ (normally fixed)
6. The peripheral OZ: POZ (normally fixed)

In order to complete the lens design, the following requirements are established or known.

7. The power of the lens (when wet) at the center: $P_w$
8. The Overall lens diameter: DL
9. The anterior OZ: AOZ
10. The junction thickness at AOZ: JTK 11. The edge thickness: ETK
12. The index of refraction when wet: n
13. The expansion factor: Exp The remaining unknown parameters to be calculated are:
(a) The thickness of the lens: t
(b) The radius of curvature of the anterior OZ: $r_1$
(c) The angle of $r_1$ for a given AOZ: $\theta_1$
(d) The peripheral convex radius of curvature: $r_{cxp}$ In this numerical example, several parameters are assumed to be non-variables and typical values are assigned for practical reasons.
(1) Q=0.025 mm
(2) $r_2$=variable
(3) $r_2'$=variable
(4) Tb=1.8 mm
(5) $r_3$=10.3 mm
(6) POZ=10.45 mm
(7) $P_w$=variable
(8) DL=12.15 mm
(9) AOZ=8 mm
(10) JTK=0.07 mm
(11) ETK=0.06 mm
(12) n=1.4325
(13) Exp=1.21

Using the numerical values (1) through (13) above, the following equations can be written:

$$P_w = \frac{1}{\frac{r_1 \times \text{Exp}}{n-1} - \frac{t \times \text{Exp}}{n}} - \frac{n-1}{r_2' \times \text{Exp}}$$

$$P_w = \frac{1}{\frac{r_1 \times 1.21}{0.4325} - \frac{t \times 1.21}{1.4325}} - \frac{0.4325}{r_2' \times 1.21}$$

$r_1$, $r_2'$ in meter for $r_1$ and $r_2'$ in mm $$P_w = \frac{1}{\frac{r_1}{357} - \frac{t}{1184}} - \frac{357}{r_2'} \tag{1}$$

Rearranging the eq (1)

$$\frac{r_1}{357} - \frac{t}{1184} = \frac{1}{P_w + \frac{357}{r_2'}}$$

$$r_1 = 0.3019t + \frac{1}{\frac{P_w}{357} + \frac{1}{r_2'}} \tag{2}$$

$$r_1 = 0.3019t + C_p \tag{3}$$

where $C_p = \frac{1}{\frac{P_w}{357} + \frac{1}{r_2'}}$

Note: $r_1$, $r_2'$ in equation (1), (2) and (3) are all in mm.

In order to make the junction thickness JTK=0.07 mm, from FIG. 4:

$$1 + 2 + 3 - 4 = 5$$

$$r_2 - \sqrt{r_2^2 - 16} + 0.025 + t - (r_1 - \sqrt{r_1^2 - 16}) = \frac{0.07}{\cos\theta_2}$$

and $$\theta_2 = \sin^{-1}\frac{4}{r_2}$$

Solving for t:

$$t = r_1 - \sqrt{r_1^2 - 16} - \tag{4}$$

$$\left[ r_2 - \sqrt{r_2^2 - 16} + 0.025 - \frac{0.07}{\cos\left(\sin^{-1}\frac{4}{r_2}\right)} \right]$$

$$t = r_1 - \sqrt{r_1^2 - 16} - K \tag{5}$$

where $K = r_2 - \sqrt{r_2^2 - 16} + 0.025 - \frac{0.07}{\cos\left(\sin^{-1}\frac{4}{r_2}\right)}$ (6)

(t and $r_2$ in mm)

Solving for t using equation (2) and (5):

$$t = 0.3019t + C_p - \sqrt{(0.3019t + C_p)^2 - 16} - K \tag{7}$$

by substituting $r_1$ from eq. (2) into eq. (5)
Solving for t from eq. (7):

$$t = 2.524C_p - 1.762K - \sqrt{6.3706C_p^2 - 3.847KC_p + 0.58K^2 - 40.38} \tag{8}$$

$$K = r_2 - \sqrt{r_2^2 - 16} + 0.025 - \frac{0.07}{\cos\left(\sin^{-1}\frac{4}{r_2}\right)} \tag{6}$$

$$C_p = \frac{1}{\frac{P_w}{357} + \frac{1}{r_2'}} \tag{3}$$

For a given set of $r_2$, $r_2'$ and $P_w$, Cp and K can be calculated and t can be calculated using Cp and K. Then $r_1$ and $\theta_1$ are calculated.

Example: $r_2$=6.94, $r_2'$=6.44, $P_w$=−3

$$C_p = \frac{1}{\frac{-3}{357} + \frac{1}{6.44}} = 6.808 \tag{9}$$

$$K = 6.94 - \sqrt{6.94^2 - 16} +$$

$$0.025 - 0.07/\cos\left(\sin^{-1}\frac{4}{6.94}\right) = 1.2080$$

$$t = 2.524 \times 6.808 - 1.762 \times 1.2080 -$$

$$\sqrt{6.3706 \times 6.808^2 - 3.847 \times 1.2080 \times 6.808 + 0.58 \times 1.2080^2 - 40.38} =$$

$$0.085$$

$$r_1 = 6.808 + 0.3019 \times 0.085 = 6.83$$

$$\theta_1 = \sin^{-1}\frac{4}{r_1}$$

-continued
$$\theta_1 = \sin^{-1} \frac{4}{6.83} = 35.8°$$

In the computation of thickness t it is desirable to maintain the junction thickness to be 0.07 mm for example. However, for highly minus power lenses the computation may give too thin a lens, or a negative thickness. For proper design, a minimum thickness is maintained, preferably for example about 0.04 mm. In such cases, the junction thickness may have to be fixed at a value greater than 0.07 mm.

Knowing the $r_2$ and $r_3$, POZ, DL AOZ, and ETK and using the calculated junction thickness JTK (0.07 mm or greater), the anterior peripheral curve $r_{cxp}$ can be calculated in a conventional way. For example, when $r_2 = 6.94$ mm, $r_3 = 10.3$ mm, POZ = 10.45 mm, DL = 12.15 mm, ETK = 0.06 mm, the JTK can be made 0.07 mm as long as the anterior curve $r_1$ is less than 7.03 mm. This gives $r_{cxp}$ the value of 8.13 mm. For $r_1$ greater than 7.03 mm, the JTK increases and $r_{cxp}$ decreases.

Figure 5:
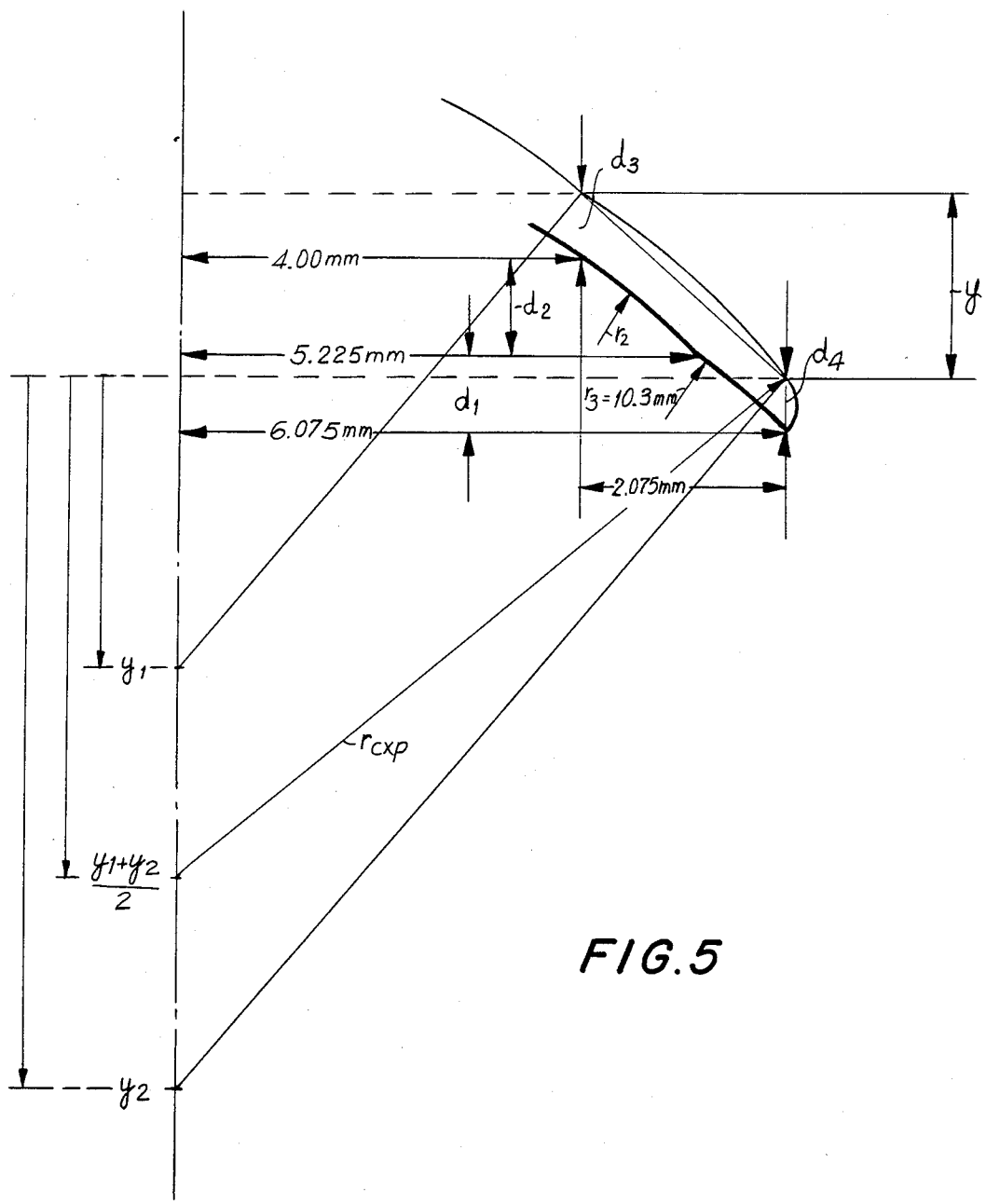
FIG. 5 is a partial cross-sectional view of the peripheral portion of the lens of FIGS. 1 and 2.

The following is an example calculation for $r_{cxp}$, referring to FIG. 5:

$$y = d_1 + d_2 + d_3 - d_4$$

$$d_1 = \sqrt{r_3^2 - 5.225^2} - \sqrt{r_3^2 - 6.075^2} = 0.5586$$

$$d_2 = \sqrt{r_2^2 - 4^2} - \sqrt{r_2^2 - 5.225^2}$$

$$d_3 = 0.07/\cos\left(\sin^{-1}\frac{4}{r_2}\right) \text{ for } t \geq 0.04 \text{ mm} \quad (10)$$

$$d_3 = 0.07/\cos\left(\sin^{-1}\frac{4}{r_2}\right) + 0.04 - t \text{ for } t < 0.04 \text{ mm} \quad (11)$$

t is the calculated lens thickness according to equation (8)

$$d_4 = 0.06/\cos\left(\sin^{-1}\frac{6.075}{10.3}\right) = 0.0743$$

$$y = 0.5586 + (\sqrt{r_2^2 - 4^2} - \sqrt{r_2^2 - 5.225^2}) + d_3 - 0.0743 \quad (12)$$

For $r_2 = 6.94$ mm, $r_2' = 6.44$ mm and $P_w = -3$ used in the Example above, the t is 0.085 mm which is greater than the practical minimum value of 0.04 mm. Then:

$$y = 0.484 + (\sqrt{r_2^2 - 4^2} - \sqrt{r_2^2 - 5.225^2}) + d_3 \quad (13)$$

$$= 0.484 + 1.1037 + 0.0857 = 1.6734$$

$$y_1 = 4 \times 2.075 \div y - y = 3.2866 \quad (14)$$

$$y_2 = 6.075 \times 2.075 \div y = 7.5329 \quad (15)$$

$$(y_1 + y_2) \div 2 = 5.4098 \quad (16)$$

$$r_{cxp} = \sqrt{\left(\frac{y_1 + y_2}{2}\right)^2 + 6.075^2} \quad (17)$$

-continued
$$r_{cxp} = \sqrt{5.4098^2 + 6.075^2} = 8.13 \text{ mm}$$

If t is greater than 0.04 mm, $r_{exp}$ is always 8.13 mm
If calculated t = −0.01 mm for example:

$$d_3 = 0.0857 + 0.04 - (-0.01) = 0.1357$$

which will be the actual JTK to make the center thickness 0.04 mm.
In that case:

$$y = 0.484 + 1.1037 + 0.1357 = 1.7234$$

$$y_1 = 4 \times 2.075 \div 1.7234 - 1.7234 = 3.0927$$

$$y_2 = 6.075 \times 2.075 \div 1.7234 = 7.3144$$

$$(y_1 + y_2) \div 2 = 5.2035$$

$$r_{cxp} = \sqrt{5.2035^2 + 6.075^2} = 8.00 mm$$

Equations (3), (6), (8), (2), (9), (10), (11), (13), (14), (15), (16) and (17) can be solved by hand or programmed into a programmable calculator or computer to print out:
t, $r_1$, $\theta_1$ and $r_{cxp}$ for a given set of $r_2$, $r_2'$ and $P_w$.

The above illustration gives detailed design and manufacturing procedures for the simultaneous multi-focal soft contact lenses using the squeeze, cut and polish methods. Once a lens is made in this manner, the lens can be duplicated readily by casting or molding. Another alternative method may be to duplicate the aspheric buttons by casting or molding means and cut the anterior part according to a patient's prescription. For the purpose of making a mold or die, a suitable metal instead of plastic lens material may be used to make the positive shape in accordance with the invention.

The same technique can be applied to a hard contact lens. However, the effect of the variable focal length is greatly reduced in a hard contact lens because the tear layer formed by the cornea's center portion and the aspheric posterior surface works in effect reducing the optical power gradient. The cornea is aspheric, but tends to be spheric in the center and greatly flattening towards the edge. This is opposite to the aspheric surface of the lens created by the squeeze method. Soft lenses, however, conform to the surface of the cornea so that the tear layer is negligible. This means that when wearing soft lenses, the posterior surface of the lenses become spherical (if the cornea is spherical) with the anterior surface becoming aspherical and maintaining the same variable focal length effect for which the lens is designed.

Figure 6:
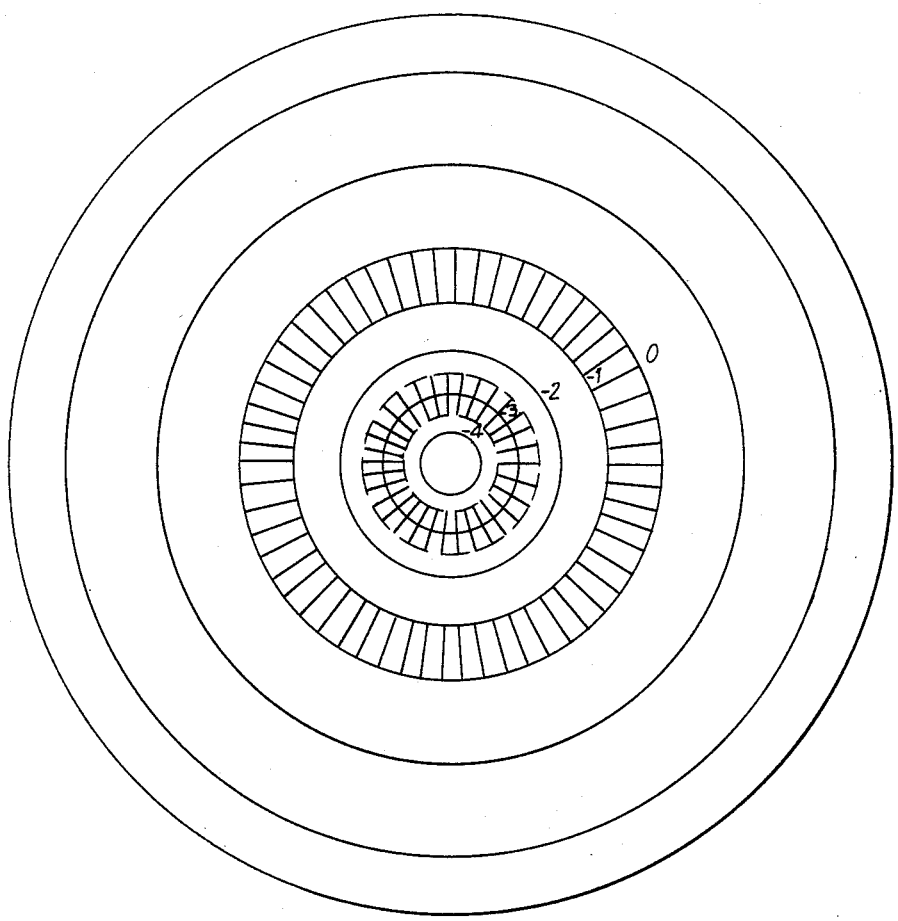
FIG. 6 is plan view of the lens of FIG. 1 illustrating circular shaped bands of the optical zone used for distant viewing and near viewing in the lens of FIGS. 1 and 2.

FIG. 6 illustrates a circular shaded band in the middle of the lens which may represent the band used for distance viewing. This band has a power of about −3 diopter. The outside shaded band may be the one used for near vision and has a power of −0.5 diopter.

Figure 7:
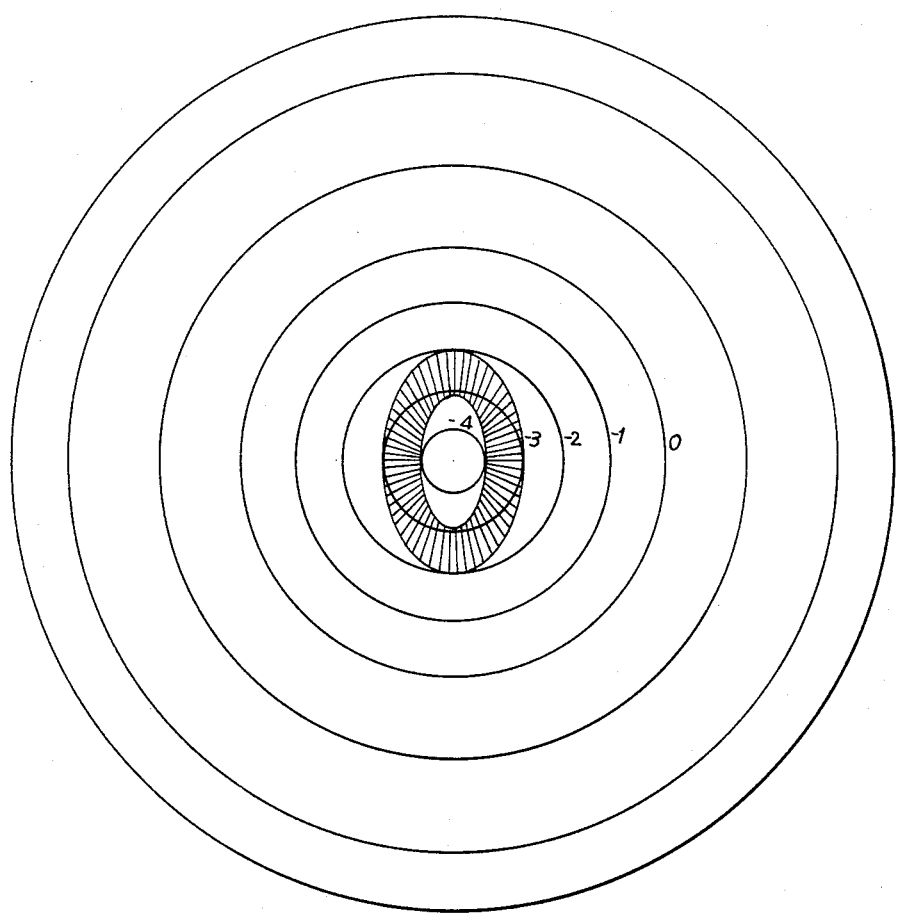
FIG. 7 is a plan view of the lens of FIG. 6 illustrating a band used for distant viewing which corrects for astigmatism.

FIG. 7 illustrates the same lens as in FIG. 6 showing an elliptic band in the optical zone of the lens which may be used for distance viewing to correct for astigmatism. The example shown in FIG. 7 is for an eye with −2.5 diopter in the vertical meridian and −3.5 diopter in the horizontal meridian. As long as the lens is analytic (continuously smoothly varying) and the sufficient power gradient exists within the 6 mm diameter of the pupil opening, the lens has the property of simultaneous vision multi-focal effect with the capability of correcting for the astigmatism. In cases of greater astigmatism (greater than the variation of the lens power can correct), the anterior surface may be made toric by conventional means used to correct astigmatism of any mono-vision contact lens. In a multi-focal toric lens, the equi-power contours will not be concentric circles as shown in FIG. 1, but they will be concentric ellipses.

Accordingly, a soft contact lens wherein the aspheric properties are concentrated in the center portion in the lens in a region generally less than the normal pupil opening provides a lens having simultaneously multi-focal properties. By providing the desired distance vision power at the center region and the power increases in an aspheric region having gradually varying optical power within the normal opening of the pupil, some part of the lens near the central portion will form a sharp image of a distant object on the retina and another part of the lens in the peripheral part will form a sharp image of near by object. Even though the center portion of the lens forms a blurred image of the near-by object, as long as there is a sharp image of the object of the retina simultaneously, the human brain selectively picks up the sharp image of the desired object. Thus, a lens suitable for far vision, intermediate vision and near vision is readily provided in accordance with the invention. Elliptical bands within the pupil opening permit forming a sharp image by an eye with astigmatism. The continuously variable multi-focal contact lenses may be prepared by distorting the lens blank in a predetermined manner and forming spherical surfaces in the distorted blank to yield the aspheric region within the normal pupil opening.

It will thus be seen that the objects set forth above, among those made apparent from the preceding description, are efficiently attained and, since certain changes may be made in carrying out the above process and in the article set forth without departing from the spirit and scope of the invention, it is intended that all matter contained in the above description and shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

What is claimed is:

1. A continuously variable multifocal soft contact lens suitable for creating sharp images of far objects, intermediate objects and near objects simultaneously on the retina of a wearer, comprising:
   a lens body having a concave surface and a convex surface, said lens having a central optical zone with continuously varying optical power from essentially the optical center point of the lens with the desired distance vision power at the center region of the optical zone and continuously increasing to the desired near vision power within a region having a dimension less than the maximum pupil opening of the wearer in the dark, the optical power of the lens increasing from the optical center point at a rate so as not to create a predominant far vision image.

2. The contact lens of claim 1 wherein the continuously varying optical power increases 3 to 5 diopters.

3. The contact lens of claim 1, wherein the diameter of the region of the continuously varying optical power is about 5.4 to 6.7 mm after expansion.

4. The contact lens of claim 1, wherein the concave surface of the lens is aspheric.

5. The contact lens of claim 4, wherein the remaining surface in the optical zone is one of aspheric, spheric or toric.

6. The contact lens of claim 4, wherein the remaining surface in the optical zone is spheric.

7. The contact lens of claim 6, wherein the diameter of the region of the continuously varying optical power is between about 5.4 mm and 6.7 mm after expansion.

8. The contact lens of claim 7, wherein the concave surface outside the region of the continuously varying optical power gradient is essentially spherical.

9. The contact lens of claim 7, wherein the power of the lens at the center when worn is in accordance with the formula:

$$P_w = \frac{1}{\frac{r_1 \times Exp}{n-1} - \frac{t \times Exp}{n}} - \frac{n-1}{r_2' \times Exp}$$

wherein the radius of curvature at the center of the concave aspheric surface is designated $r_2'$, t is the thickness of the lens at the center, the radius of the anterior surface of the optical zone is $r_1$, Exp is the expansion factor for the lens material and n is the index of refraction of the lens when worn, all other dimensions in the state before expansion.

10. The contact lens of claim 9, wherein the thickness of the lens at the center is no less than about 0.04 mm.

11. The contact lens of claim 9, wherein the minimum thickness of the junction between the optical zone and the spheric concave surface is about 0.07 mm.

12. The contact lens of claim 9, wherein the diameter of the optical zone is about 8 mm.

13. The contact lens of claim 9, wherein the diameter of the lens is about 12.15 mm.

14. The contact lens of claim 1, wherein the lens is formed of a HEMA polymer.

15. The contact lens of claim 1, wherein the continuously varying optical power has complete rotational symmetry.

16. The contact lens of claim 1, wherein the continuously varying optical power is adapted to provide at least one non-circular band within the pupil opening to correct for astigmatism.

17. The contact lens of claim 1 formed by squeezing a lens blank by contacting a first surface with ball means having a spherical surface of radius R to deflect the opposed surface of the lens blank, cutting and polishing the opposed surface to a desired concave spherical shape, controlling the squeezing by the amount of deflection of the lens blank and the radius R of the ball means so that upon release of the lens blank, a lens button having an aspheric concave surface with varying radius of curvature at least within a dimension less than the maximum pupil opening of a wearer is formed and finishing the first surface to form a convex surface of the lens to yield when wet and expanded a contact lens having continuously variable optical power with the desired distance vision power at the center region of the lens and increasing to the desired near vision power within the dimension of the maximum pupil opening.

18. The contact lens of claim 1, formed by molding.

19. The contact lens of claim 1, formed by casting.

20. A method for fabricating a continuously variable multi-focal soft contact lens from a lens blank having two opposed surfaces, comprising:

squeezing the lens blank by contacting a first surface with ball means having a spherical surface of radius R to deflect the opposed surface of the lens blank;

cutting and polishing the opposed surface to a desired concave spherical shape;

controlling the squeezing by the amount of deflection of the lens blank and the radius R of the ball means so that upon release of the lens blank a lens button is formed having an aspheric concave surface having a sufficient variation of radius of curvature within a dimension less than the maximum pupil opening of a wearer in the dark after expansion of the finished lens; and finishing the first surface to form a convex surface of the lens to yield a contact lens which when wet and expanded has continuously variable optical power increasing from essentially the optical center point of the lens with the desired distance vision power at the center region of the lens and increasing to the desired near vision power within the dimension of the maximum pupil opening of the wearer in the dark, the optical power of the lens increasing at a rate so as not to create a predominant far vision image, whereby the lens is suitable for creating sharp images of far objects, intermediate objects and near objects simultaneously on the retina of a wearer.

21. The method of claim 20, including the step of first precutting a concave shape in the opposed surface of the lens blank prior to squeezing in order to avoid cracking of the lens blank.

22. The method of claim 20, wherein the first surface is finished to a spherical convex surface.

23. The method of claim 20, wherein the first surface is finished to a toric surface.

24. The method of claim 20 including the step of controlling the squeezing of the blank to yield a lens wherein the power of the lens at the center when worn is in accordance with the formula:

$$P_w = \frac{1}{\frac{r_1 \times Exp}{n-1} - \frac{t \times Exp}{n}} - \frac{n-1}{r_2' \times Exp}$$

wherein the radius of curvature at the center of the concave aspheric surface is designated $r_2'$, t is the thickness of the lens at the center, the radius of the anterior surface of the optical zone is $r_1$, Exp is the expansion factor for the lens material and n is the index of refraction of the lens when worn, all other dimensions in the state before expansion.

25. The method of claim 20, including the further step of forming a mold from the squeezed and cut contact lens and casting additional lens in the mold.

26. A method for fabricating a lens blank having two surfaces for preparing a soft contact lens having continuously variable optical power at least within a region less than the maximum pupil opening of a wearer in the dark when the lens is finished and ready for use, comprising:

squeezing a lens blank by contacting a first surface with ball means having a spherical surface of radius R to deflect the opposed surface of the lens blank;

cutting and polishing the opposed surface to a desired concave shape; and controlling the squeezing by the amount of deflection of the lens blank and the radius R of the ball means so that upon release of the lens blank, a lens button having an aspheric concave surface from essentially the optical center point of the lens button is formed, whereby the optical power gradient within a dimension less than the maximum pupil opening of a wearer in the dark after the finished soft contact lens is formed, the optical power increasing from essentially the center point at a rate so as not to create a predominant far vision image and is suitable for creating sharp images of far objects, intermediate objects and near objects simultaneously on the retina of a wearer.

27. The method of claim 26, wherein the first surface is finished to a spherical shape.

28. A method for fabricating a mold for forming a soft contact lens button having a sufficient amount of continuously variable optical power within a region less than the maximum pupil opening of a wearer in the dark when the lens is finished, expanded and ready for wear, comprising:

squeezing a metal blank having two opposed planar surfaces by contacting a first surface with ball means having a spherical surface of radius R to deflect the opposed surface of the metal blank;

cutting and polishing the opposed surface of the metal blank to a desired concave shape;

controlling the squeezing by the amount of deflection of the blank and the radius R of the ball means so that upon release of the metal blank a metal button having an aspheric concave surface is formed; and forming a mold from the positive metal shape, whereby a soft contact lens material cast in the mold yields a lens button having an aspherical concave surface having a variable radius of curvature from essentially the optical center point of the lens button to a dimension at least equal to the maximum pupil opening of a wearer in the dark after a finished soft contact lens is formed from the lens button, the optical power of the lens increasing from the center point at a rate so as not to create a predominant far vision image;

whereby a finished lens formed from the lens button is suitable for creating sharp images of far objects, intermediate objects and near objects simultaneously on the retina of a wearer.

29. The method of claim 28, including the step of finishing the first surface to form a convex surface prior to forming the mold so that soft contact lens material when cast in the mold has a continuously variable optical power with the desired distance vision power at the center region of the lens and increases to the desired near vision power with the dimension of the maximum pupil opening of a wearer.

30. A continuously variable multi-focal soft contact lens suitable for creating sharp images of far objects, intermediate objects and near objects simultaneously on the retina of a wearer, comprising:

a lens body having a concave surface and a convex surface, said lens having a central optical zone with continuously varying optical power in the optical zone with the desired distance vision power at the center region of the optical zone and continuously increasing from essentially the optical center point of the lens to the desired near vision power within a region having a diameter less than about 6 mm, the optical power of the lens increasing at a rate so as not to create a predominant far vision image and the concave surface being aspherical within the optical zone and the convex surface in the optical zone is one of aspheric, spheric or toric.

31. The contact lens of claim 30, wherein the convex surface in the optical zone is spheric.

32. The contact lens of claim 30, wherein the lens body is formed of a HEMA polymer.

33. A continuously variable multi-focal soft contact lens suitable for creating sharp images of far objects, intermediate objects and near objects simultaneously on the retina of a wearer, comprising:

a lens body having a concave surface and a convex surface, said lens having a central optical zone with a continuously varying optical power in the optical zone with the desired distance vision power at the center region of the optical zone and continuously increasing from essentially the optical center point of the lens to the desired near vision power within a region having a dimension less than the maximum pupil opening of the wearer in the dark, the optical power of the lens increasing at a rate so as not to create a predominant far vision image and wherein the power of the lens at the center of the optical zone when soft is in accordance with the formula:

$$P_w = \frac{1}{\frac{r_1 \times Exp}{n-1} - \frac{t \times Exp}{n}} - \frac{n-1}{R_2' \times Exp}$$

$$P_w = \frac{1}{\frac{r_1 \times Exp}{n-1} - \frac{t \times Exp}{n}} - \frac{n-1}{r_2' \times Exp}$$

and wherein the radius of curvature at the center of the concave surface at the center is designated $r_2'$, t is the thickness of the lens at the center, the radius of the anterior surface of the optical zone is $r_1$, Exp is the expansion factor for the lens material and n is the index of refraction of the lens when soft, all other dimensions in the dry state.

34. The contact lens of claim 33, wherein the thickness of the lens at the center is no less than about 0.04 mm.

35. The contact lens of claim 33, wherein the minimum thickness of the junction between the optical zone and the spheric concave surface is about 0.07 mm.

* * * * *